United States Patent [19]

Popper

[11] 4,129,290
[45] Dec. 12, 1978

[54] COMPRESSION AND TENSION SPRING

[75] Inventor: Jakhin B. Popper, Kyriat Motzkin, Israel

[73] Assignee: Popper Engineering Ltd., Kyriat Motzkin, Israel

[21] Appl. No.: 797,111

[22] Filed: May 16, 1977

[30] Foreign Application Priority Data

May 14, 1976 [IL] Israel ......................................... 49583

[51] Int. Cl.² .............................................. F16F 3/02
[52] U.S. Cl. ..................................... 267/160; 267/164
[58] Field of Search ........... 188/1 B; 267/19 A, 19 R, 267/40, 41, 144, 160, 164, 165

[56] References Cited

U.S. PATENT DOCUMENTS

| 262,038 | 8/1882 | Hayhurst | 267/164 X |
|---|---|---|---|
| 2,828,801 | 4/1958 | Papst | 267/165 X |
| 3,238,780 | 3/1966 | Doyle | 267/160 X |
| 3,596,865 | 8/1971 | Camossi | 267/160 |

*Primary Examiner*—Duane A. Reger
*Attorney, Agent, or Firm*—Browdy and Neimark

[57] ABSTRACT

A spring comprising a first member having an inner and outer end; a second member; and spacer means connecting said first member adjacent its inner end to said second member in spaced generally parallel partially overlapping disposition at rest.

14 Claims, 15 Drawing Figures

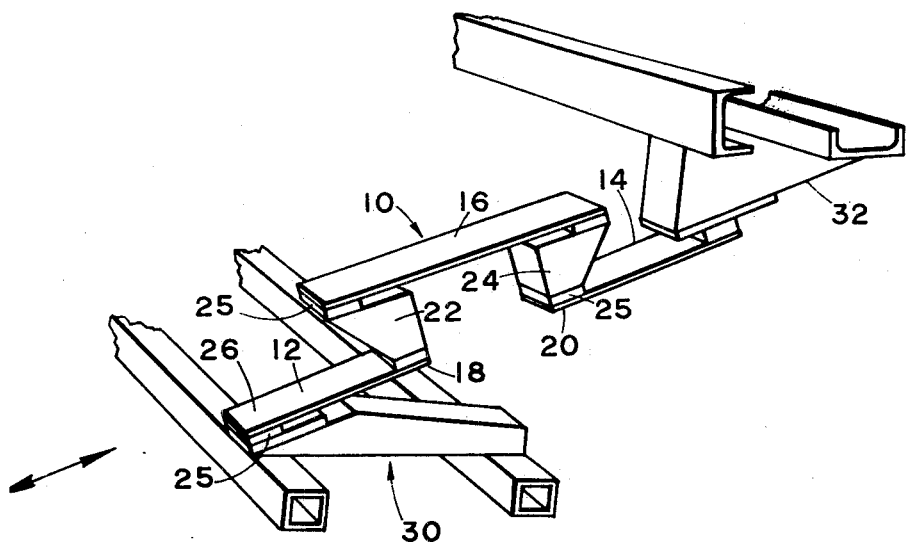
Fig. IA
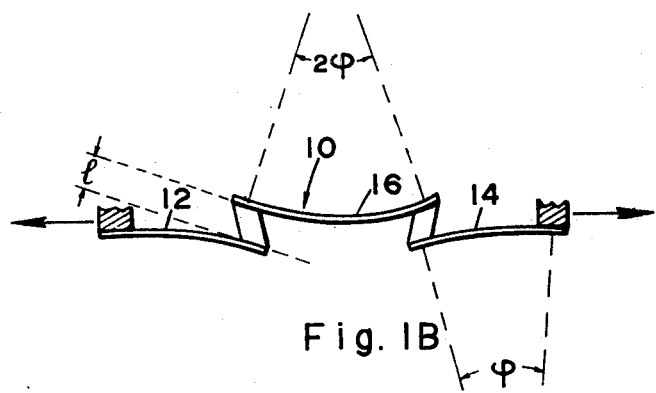
Fig. IB
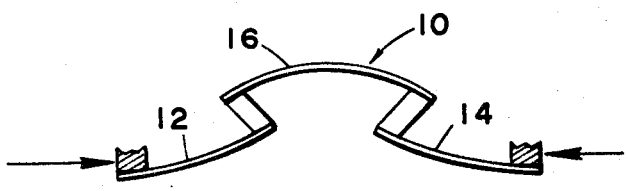
Fig. IC

COMPRESSION AND TENSION SPRING

The present invention relates to springs and more particularly to a compression and/or tension spring.

In relatively large vibrating systems the cost of springs has an important influence on the overall price of the system. While coil springs are often best from the point of view of stored energy, Q, which is an important factor in the design of vibrating systems, such springs are relatively expensive. Coil springs also involve the disadvantage in that a coil spring can also flex transversely to its axis. This feature sometimes makes the use of a coil spring incompatible with certain systems.

As a result leaf springs are used whenever possible notwithstanding their less desirable mechanical qualities. The weight of a common leaf spring as a function of stored energy is relatively high and is given by the equation:

$$W_{leaf} = 18 \frac{\gamma E}{S^2} Q \tag{1}$$

where
Q equals the stored energy;
γ equals the specific weight of the spring material;
E equals the Joungs modulus of elasticity; and
S equals the permissible stress of the spring.

The present invention seeks to overcome the disadvantages of coil and leaf springs and provides a new spring lighter in weight than the ordinary leaf spring, less expensive and less subject to transverse deflections than coil springs. It also provides a spring whose nonlinear behaviour is controllable, a feature which often is desirable in practical applications.

There is thus provided in accordance with an embodiment of the invention a spring comprising:
a first member having an inner and outer end;
a second member; and
spacer means connecting said first member adjacent its inner end to said second member in spaced generally parallel partially overlapping disposition at rest.

In accordance with an alternative embodiment of the invention, the spring also comprises a third member having an inner and outer end and the spacer means connects said first and third members adjacent their respective inner ends to said second member in spaced generally parallel partially overlapping disposition at rest.

There is thus provided in accordance with an embodiment of the invention a spring comprising:
first and second end members each having an inner and outer end;
a central member; and
spacer means connecting said end members adjacent their respective inner ends to said central member in spaced generally parallel, partially overlapping disposition at rest.

In accordance with a specific embodiment of the invention, the end members and the central members are generally elongate planar members and are arranged with their longitudinal axes along a line along which compressive or tensile forces are applied.

There is also provided in accordance with an embodiment of the invention a combination of two of the above springs.

The invention will be more fully understood and appreciated from the following detailed description taken in conjunction with the drawings in which:

FIG. 1A is a pictorial illustration of a spring constructed and operative in accordance with an embodiment of the invention and coupled to relatively moving members;

FIG. 1B is a sectional illustration of the spring of FIG. 1A under tension;

FIG. 1C is a sectional illustration of the spring of FIG. 1A under compression;

Figure 1D:
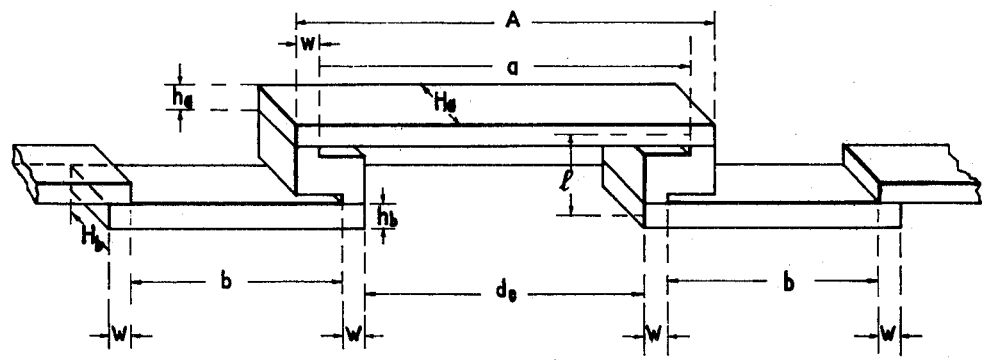
FIG. 1D is a pictorial schematic side view of the spring of FIG. 1A.

Referring now to FIG. 1A there is shown a spring 10 comprising first and second elongate end members 12 and 14 and a central elongate member 16 attached to the inner ends 18 and 20 of respective end members 12 and 14 by means of connecting members 22 and 24. Connecting members 22 and 24 may be formed of any suitable material such as wood or plastic and include connectors 25 for attachment to the respective ends of members 12, 14 and 16. Members 12, 14 and 16 are arranged at rest to be in generally parallel co-directional arrangement.

The connecting members are configured so as to permit partially overlapping disposition of central member 16, on the one hand, and end members 12 and 14, on the other hand. As seen in FIG. 1A members 12, 14 and 16 are generally planar elongate members. It is appreciated, however, that members 12, 14 and 16 may alternatively be formed in other configurations, examples of which will be described hereinafter.

Extreme outer ends 26 and 28 of spring 10 are coupled to members 30 and 32, whose relative disposition and relative motion it is sought to govern. The alignment of spring 10 is selected such that the general direction of the longitudinal axes of members 12, 14 and 16 lie along the direction of relative motion of the thus joined members.

FIG. 1B shows spring 10 under tension. It is noted that central member 16 bows inwardly towards the plane defined by members 12 and 14 while members 12 and 14 bow outwardly towards the plane defined by central member 16.

The condition of spring 10 under compression is illustrated in FIG. 1C which shows that compression produces outward bowing of central member 16 away from the plane defined by members 12 and 14 and inward bowing of members 12 and 14 in a direction away from the plane defined by central member 16.

Particular features of the spring illustrated in FIG. 1A will now be described in connection with FIGS. 1B, 1C and 1D.

The new spring illustrated in FIG. 1A has a net weight given by the expression $$W = 6 \frac{\gamma E}{S^2} Q \tag{2}$$

i.e. one third of the weight of ordinary leaf springs as given in equation (1) above.

The rigidity, k, i.e. the force required to deflect the spring by a unit length of a typical symmetrical spring such as that illustrated in pictorial side view in FIG. 1D and having a center leaf indicated by index a and side leaves indicated by index b is given by $$k = \frac{1}{24} \frac{E H_b h_b^3}{l^2 b} \left[ 1 + 2 \frac{b H_a h_a^3}{a H_b h_b^3} \right] \tag{3}$$

where $H_i$ is the width of a leaf spring of index i, where i is
a or b
$h_i$ is the thickness of a leaf spring of index i;
l is the lateral distance between the centers of the leaves, and
a and b are the total free lengths of the respective springs.

The total length of this spring between connections is given by $$L_T = 2b + 4w + d_c$$

where the w is width of the connector and $d_c$ is the total non-overlapped length along the center leaf and represents the maximum possible deflection under compression.

The above equation (3) is based upon a deflection d equal to 2 Pl where P is the angle between respective ends of the leaf springs due to the deflection arising from the bending moment ½ Pl, as indicated in FIG. 1B and also represents the rotation angle of the connecting member and P is the force that loads the spring in the direction of its intended deflection. Thus P = kd.

The stress strain relation is given by the expression:

$$\text{stress of center leaf} = S_a = \frac{1}{2} E \frac{d}{l} \frac{h_a}{a} \tag{4}$$

$$\text{stress of end leaf} = S_b = \frac{1}{4} E \frac{d}{l} \frac{h_a}{b}$$

The approximate precentage deviation p of the spring's rididity is given by the following expressions:

$$p = \frac{d}{l^2} \mathcal{H} \tag{5}$$

when $$\mathcal{H} = W + \frac{1}{2} d_c - \frac{1}{2} (\frac{a}{2} - b) \tag{6}$$

rendering:

$$\text{spring rididity as a function of deflection} = k_d = \frac{\delta P}{\delta d} = k(1 + p) \tag{7}$$

The above relationship may be illustrated by taking $$d/b = 1/100; \frac{a}{2} = b; \frac{d_c}{l} = \frac{22.5}{100} \text{ and } \frac{W}{L} = \frac{22}{100}$$

i.e. $\frac{\mathcal{H}}{l} = \frac{1}{3}$

Then p = 1/300≈0.33%, which means that while extended by d/1 = 0.01, the local rididity $k_d$ is by 3.3 × $10^{-3}$ larger than its nominal value and while compressed the rigidity will become smaller by 3.3 × $10^{-3}$.

By making $\mathcal{H}$ = 0 one gets a linear spring while a positive $\mathcal{H}$ provides a spring that becomes more rigid when in tension, which may keep the spring from becoming over stressed since higher loads will not cause significant increased deflection. Thus the spring can be employed as a flexible hanger. Where the spring is used as a flexible support in compression there is no danger of overloading the springs since once d = $d_c$ no more deflection can take place. Therefore a positive $\mathcal{H}$ may then give a softer spring, often essential for vibrations isolation.

The non-linear spring can also be useful for maintaining its natural frequency even if the suspended weight i.e. mass is changed. Since the frequency is given by:

$$f = \frac{1}{2\pi} \sqrt{\frac{k_d g}{W}}$$

when W = load the larger W increases d which increases $k_d$ compensating for the greater W and maintaining practically the same f.

Figure 2A:
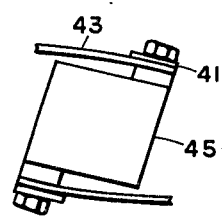
FIG. 2A is a schematic illustration of an embodiment of spring connection under compression or at rest.
Figure 2B:
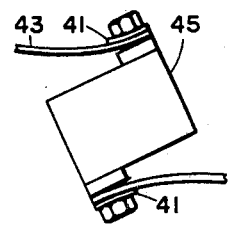
FIG. 2B is a schematic illustration of the apparatus of FIG. 2A under tension.

If spring linearity is of greater importance it is also possible that the connection between the connector and the ends of the springs may be configured and designed so as to distort under stress thereby increasing the effective a and b and decreasing the spring's rigidity. Such a structure is illustrated in FIGS. 2A and 2B in which flexible support plate 41 is employed to clamp a flat spring 43 against connector 45. FIG. 2A shows the springs at rest or under compression and FIG. 2B shows the springs under tension with springs 43 partially separated from connectors 45.

Figure 3:
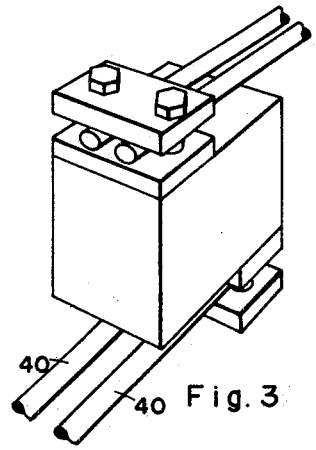
FIG. 3 is a partial view of a spring constructed and operative in accordance with an embodiment of the invention.

According to an alternative embodiment of the invention an omega spring may be constructed to permit flexure in both lateral directions. Such a spring may be constructed by replacing planar members 12, 14 and 16 (FIG. 1A) by rods. An embodiment of a spring constructed this way is illustrated in FIG. 3.

Figure 4:
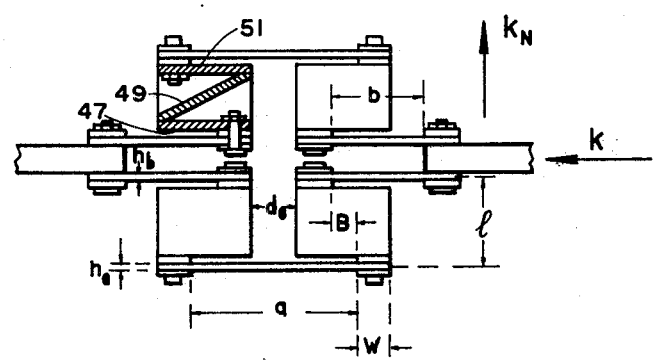
FIG. 4 is a schematic side view illustration of a combination of springs constructed according to an embodiment of the invention.

A spring of double strength capacity is illustrated in FIG. 4 and comprises a pair of omega springs constructed in accordance with the aforesaid description arranged in back to back generally parallel relationship.

There is also illustrated in FIG. 4 a connecting member constructed in accordance with an embodiment of the invention and itself comprising a plurality of spring members 47, 49 and 51 arranged with their respective adjacent ends connected to permit flexure of the respective connectors thereby to increase the effective free length of the spring. The flexible connector illustrated in FIG. 4 can of course be incorporated in any of the omega springs described herein and is not limited to use with omega springs arranged in back to back relationship or in any other specific arrangement.

Figure 5:
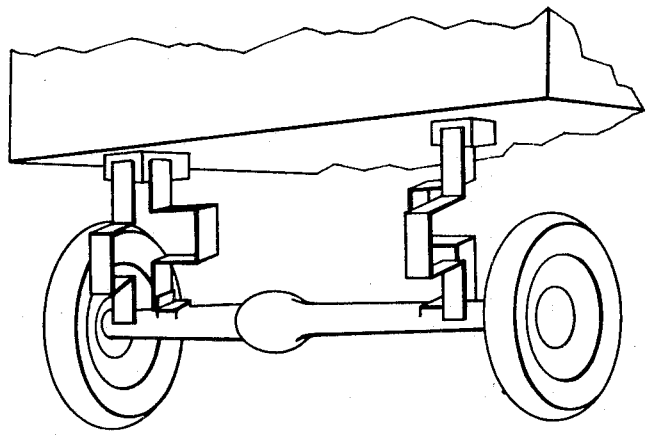
FIG. 5 is a pictorial illustration of a vehicle suspension incorporating combination of springs constructed in accordance with an embodiment of the invention arranged in perpendicular planes to prevent transverse deflections.

In accordance with an alternative embodiment of the invention a pair of omega springs or alternatively a pair of back to back sets of omega springs as illustrated in FIG. 4 may be arranged in a generally co-directional perpendicular arrangement thereby permitting deflections substantially only along a preferred axis and thus substantially preventing lateral deflections. Such an arrangement may be especially useful for vehicle suspensions as illustrated in FIG. 5.

As noted earlier in connection with FIG. 4 the connecting member which joins the spring members may be constructed in a variety of different ways and can be designed to be relatively light and inexpensive.

Figure 6:
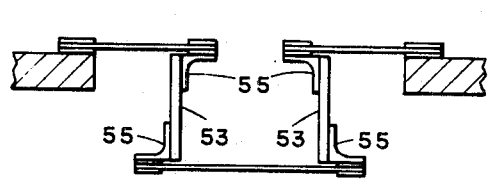
FIG. 6 is a side view of a spring constructed and operative in accordance with an embodiment of the invention.

FIG. 6 shows an omega spring wherein the connector itself comprises a leaf spring 53. Leaf spring 53 is connected at either end to an angle bracket 55 which in turn is connected to a respective end of either a central or end spring member. The spring 53 illustrated in FIG. 6 stores energy in accordance with the equation $W_{leaf} = 18 (E/S^2)Q$. Therefore it is worthwhile to build a connector of relatively low quality material and configured so as to achieve a relatively low stress capacity.

Figure 7:
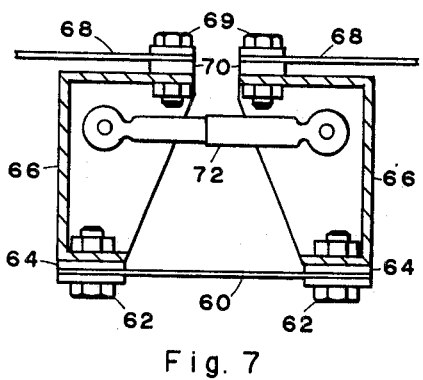
FIG. 7 is a sectional view of a spring constructed and operative in accordance with an embodiment of the invention.

An alternative embodiment of the spring is shown in FIG. 7. A central leaf member 60 is coupled via bolts 62 and connectors 64 to respective connecting members 66. End leave are likewise connected via bolts 69 and connectors 70 to connecting members 66 such that end leave 68 partially overlie central leaf 60. Connecting members 66 are coupled together additionally by means of a vibration damper typically a hydraulic piston and cylinder combination 72 to provide a predetermined amount of flexibility and play between the connecting members.

Figure 8:
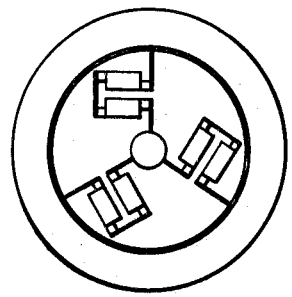
FIG. 8 is a schematic side view of a wheel suspension constructed and operative in accordance with an embodiment of the invention.

Referring now to FIG. 8 there is shown a disposition of springs constructed and operative in accordance with an embodiment of the invention radially between the hubs and the wheel rim. The configuration shown overcomes a difficulty which has long been appreciated and has long remained unsolved until the present since both coil and spiral leaf springs permit axial deflections which are generally incompatible with most common wheel applications.

A particular advantage of the spring constructed and operative in accordance with an embodiment of the invention is relative ease or rigidity adjustment. As seen from equation (3) above rigidity is reduced by lengthening l, the lateral distance between the leaves.

It is obvious that the spring construction illustrated in FIG. 4 will not impart any bending moment to structure onto which the spring ends are attached, where as the single spring of FIG. 1A tends to bend its mounting structure.

Figure 9:
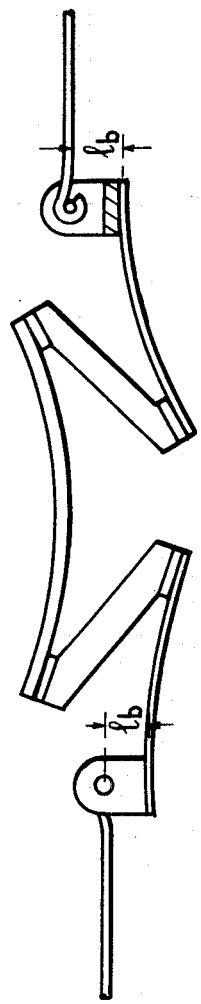
FIG. 9 is a schematic side view of an alternate embodiment of the invention.

However, if the force P is applied at a location offset from the plane of the spring by a distance $l_b$ there will be no bending moment noticeable and the spring may even be fixed via a pivot as illustrated in FIG. 9 provided that the following condition is fulfilled:

$$l_b = l \frac{1}{1 + 2\frac{H_a h_a^2 b}{H_b h_b^2 a}}$$

Figure 11:
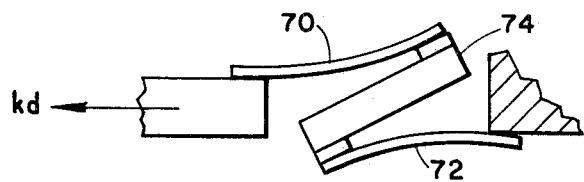
FIG. 11 is a schematic side view of an alternate embodiment of the invention.
Figure 10:
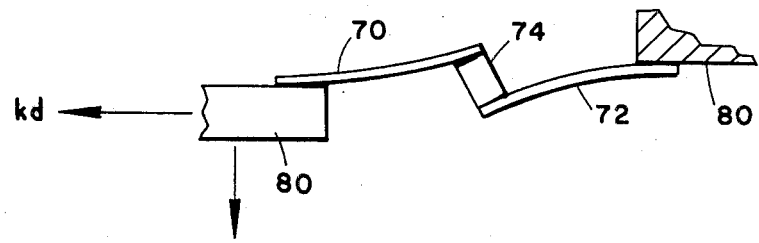
FIG. 10 is a schematic side view of an alternate embodiment of the invention.

Reference is now made to FIGS. 10 and 11 which show springs constructed according to an alternative embodiment of the invention and comprising first and second leaves 70 and 72 joined by a connection member 74. Both of the springs are arranged such that the respective inner ends are connected to each other in spaced generally parallel partially overlapping disposition at rest. The spring illustrated in FIG. 10 does not provide for overlap of the free, unconnected portions of the respective spring leaves 70 and 72 and thus involves the production of transverse forces on respective mounting members 80 and 82 upon application of compression or tension to the spring as indicated, for example, by the arrow indicating a force $k_d$. The spring in FIG. 10 is also non-linear due to the fact that increase compression or tension produces an increased in the effective transverse distance between the centers of the leaves.

In contrast, the spring illustrated in FIG. 11 provides overlap of free unconnected portions of the respective leaves 70 and 72. This arrangement enables rotation of connecting member 74 in response to the application of compression or tension and thus permits transverse deflection of the inner ends of the respective spring leaves so as to compensate for the decreased transverse distance between the leaf centers and thus to maintain a generally constant effective distance between the centers. As a result the effective bending moment of the spring is maintained constant, preserving spring linearity.

It will be appreciated by those skilled in the art that the embodiments described hereinabove and illustrated in the drawings are merely exemplary of a wide range of spring constructions, dispositions and arrangements encompassed within the present invention. Therefore, the invention is limited only by the claims which follows.

It will further be appreciated by those skilled in the art that many of the equations appearing in the present specification and claims are not precise expressions but rather engineering approximations to physical realities.

I claim:
1. A spring comprising:
    a first flexible member having a first inner end and a first outer end and extending linearly along a first longitudinal axis at rest;
    a second flexible member having a second inner end and a second outer end and extending linearly along a second longitudinal axis at rest;
    spacer means connecting said first flexible member adjacent said first inner end to said second flexible member adjacent said second inner end in spaced generally parallel disposition at rest; and
    a third flexible member having a third inner end and a third outer end and extending linearly along a third longitudinal axis at rest; and
    second spacer means connecting said first member adjacent said first outer end to said third member adjacent said third inner end in spaced generally parallel disposition at rest and also comprising pivot means attached to at least one of said second and third members and displaced therefrom in a direction transverse to the plane thereof; and wherein said displacement is given by the following expression:

$$\text{displacement } \rho_b = \rho \frac{1}{1 + 2\frac{H_a h_a^2 b}{H_b h_b^2 a}}$$

where $H_a$ is the width of the central member;
$h_a$ is the thickness of the central member;
b is the free length of each of the end members;
$H_b$ is the width of the end members;
h is the thickness of the end members;
a is the free length of the central member.

2. A spring comprising:
a first flexible member having a first inner end and a first outer end and extending linearly along a first longitudinal axis at rest;
a second flexible member having a second inner end and a second outer end and extending linearly along a second longitudinal axis at rest; and
spacer means connecting said first flexible member adjacent said first inner end to said second flexible member adjacent said second inner end in spaced generally parallel disposition at rest;
and wherein said first flexible member bows outwardly in a direction opposite that facing said second longitudinal axis and said second member bows outwardly in a direction opposite that facing said first longitudinal axis in response to the application of a compression force on said respective first and second flexible members along an axis parallel to said first and second longitudinal axes; and
said first flexible member bows inwardly in a direction towards said second longitudinal axis and said second member bows inwardly in a direction towards said first longitudinal axis in response to the application of a tension force on said respective first and second flexible members along an axis parallel to said first and second longitudinal axes.

3. A spring according to claim 2 and also comprising a third flexible member having a third inner end and a third outer end and extending linearly along a third longitudinal axis at rest and, second spacer means connecting said first member adjacent said first outer end to said third member adjacent said third inner end in spaced generally parallel disposition at rest.

4. A spring according to claim 3 and wherein
said second and third axes are identical, and
said first flexible member bows outwardly in a direction opposite that facing said second longitudinal axis and said second member bows outwardly in a direction opposite that facing said first longitudinal axis in response to the application thereon of a compression force along an axis parallel to said first, second and third longitudinal axes, said second member bows outwardly in a direction opposite that facing said first longitudinal axis in response to the application thereon of a compression force along an axis parallel to said first, second and third longitudinal axes, and said third member bows outwardly in a direction opposite that facing said first longitudinal axis in response to the application thereon of a compression force along an axis parallel to said first, second and third longitudinal axes.

5. A spring according to claim 2 and wherein said first and second members are connected by said spacer means in partially overlapping disposition at rest.

6. A spring according to claim 5 and wherein said spacer means comprises a connecting member defining first and second opposite ends and first and second connectors, said first connector being attached to said first end of said connecting member and to said first inner end of said first member and said second connector being attached to said second end of said connecting member and to said second inner end of said second member and wherein the combined width of said first and second connectors is less than the amount of overlap between said first and second flexible members.

7. A spring according to claim 2 wherein said first and second flexible members comprise planar leaves.

8. A spring according to claim 2 wherein at least one of said first and second flexible members comprise rods.

9. A spring according to claim 2 wherein said spacer means comprises spring means.

10. A spring according to claim 2 and including flexible coupling means for attaching the respective ends of said first and second flexible members to said spacer means.

11. Spring means permitting flexion substantially only along a single axis comprising a plurality of springs according to claim 9, said springs being arranged in generally co-directional disposition with the planar leaves of respective springs lying in mutually perpendicular planes.

12. Coupling means for resiliently coupling a wheel to a hub comprising a plurality of springs according to claim 2 aligned with their respective longitudinal axes extending radially between said hub and said wheel.

13. A spring according to claim 2 wherein said first and second members are arranged such that portions thereof, unconnected to said spacer means, overlap.

14. A spring according to claim 3 and also comprising pivot means attached to at least one of said second and third members and displaced therefrom in a direction transverse to the plane thereof.

* * * * *